United States Patent [19]

Chang

[11] 4,150,079
[45] Apr. 17, 1979

[54] METHOD FOR CONTROLLING CRYSTALLIZATION IN THERMOPLASTIC MATERIALS

[75] Inventor: Long F. Chang, Toledo, Ohio

[73] Assignee: Owens-Illinois, Inc., Toledo, Ohio

[21] Appl. No.: 826,504

[22] Filed: Aug. 22, 1977

[51] Int. Cl.² .......................... B29C 17/07; B29F 1/06
[52] U.S. Cl. ................................... 264/523; 264/328; 264/331; 264/570
[58] Field of Search .................. 264/328, 329, 331, 89, 264/94, 97

[56] References Cited

U.S. PATENT DOCUMENTS

| | | | |
|---|---|---|---|
| 2,617,150 | 11/1952 | Rubin | 264/331 |
| 3,822,332 | 7/1974 | Hrach et al. | 264/97 |
| 3,849,530 | 11/1974 | Wyeth et al. | 264/98 X |

FOREIGN PATENT DOCUMENTS 609795  10/1948  United Kingdom ..................... 264/328

Primary Examiner—Jan H. Silbaugh
Attorney, Agent, or Firm—Richard D. Heberling; Myron E. Click; David H. Wilson

[57] ABSTRACT

A method and apparatus are disclosed for controlling crystallization in thermoplastic materials, such as polyethylene terephthalate, which crystallize when cooled from melt temperature to below glass transition temperature after being injected into a mold cavity. When greater amounts of crystallization are desired, a very high pressure is initially imposed upon the material as it cools from the melt temperature, and then the pressure is reduced proportionally to the reduction in temperature so that a nominal pressure is imposed upon the material at glass transition temperature. When a significantly lesser amount of crystallization is desired, an initial nominal pressure is imposed upon the material as it cools from the melt temperature to a predetermined temperature, at which time the pressure is drastically increased.

10 Claims, 18 Drawing Figures

METHOD FOR CONTROLLING CRYSTALLIZATION IN THERMOPLASTIC MATERIALS

BACKGROUND OF THE INVENTION

This disclosure relates to the method and apparatus for forming articles from thermoplastic materials, and more particularly to the method and apparatus for controlling the amount of crystallization by controlling the rate of spherulite growth in such materials during solidification cooling in a mold cavity.

Certain thermoplastic materials such as polyethylene therephthalate exhibit a strong tendency to crystallize within certain temperature ranges which are traversed as these materials cool from melt temperature within a mold cavity. Since the total amount of crystallization in the material is essentially the same regardless of the degree of constant pressure imposed upon the material, the extent of crystallinity has previously been controlled by temperature.

Typically, the amount of crystallization has been suppressed in a temperature-controlled method by rapidly quenching the material within the mold cavity and thereby rapidly traversing the crystallizable temperature range. This particular method, however, has its inherent drawbacks and limitations. Most notably temperature reduction in the material is dependent upon thermal conductivity of both the thermoplastic material and the mold. Larger articles obviously require greater time to cool and are thus subject to greater crystallization. More importantly, the temperature-controlled method does not provide the practical capability of significantly reducing crystallization to certain desirable levels for large articles.

In those situations where more extensive crystallization is desired, the temperature-controlled method may be successively used to achieve a desired level of crystallization. However, it will be appreciated that the thermoplastic material must remain in the mold for greater periods of time, resulting in an increased cycle time.

In short, the temperature-controlled methods for either suppressing or inducing crystal growth in the material present undesirable problems.

SUMMARY OF THE INVENTION

The present invention overcomes the prior art problems and shortcomings in a method and apparatus which produce a novel product by varying the pressure on the thermoplastic material in a predetermined, controlled manner during a cooling cycle from melt temperature to below glass transition temperature.

It has been determined that the total amount of crystallization or haze in polyethylene terephthalate may be related to the size of the spherulites, and the growth rate of the spherulites can be expressed as an essentially bell-shaped curve plotted on a temperature axis and that the position of the curve on the axis is dependent upon the pressure imposed upon the material, with the curve being positioned along the axis toward higher temperatures at higher pressures. Thus, a family of bell-shaped curves corresponding to different pressures may be generated along a temperature axis to represent spherulite growth during solidification cooling from melt temperature to below glass transition temperature. The rate of spherulite growth is a measure of the rate of crystallization. However, since the spherulites grow in a three dimensional space, the rate of growth is not precisely the same as the rate of crystallization. The rate of spherulite growth increases more rapidly than the rate of crystallization as the spherulites become larger.

The present invention is concerned with varying the pressure on crystallizable thermoplastic materials while such materials cool through the crystallizable temperature range thereby, in effect, shifting the rate of spherulite growth in the material range thereby, in effect to a desired curve in order to either suppress or induce crystal growth. This invention may be expressed in a variety of ways, as evidenced by the originally presented claims. To avoid repeating all those claims at this point, yet to summarize the invention, the following brief description of the invention is provided:

In the method of suppressing crystal growth by reducing the rate of spherulite growth, a mold cavity is filled with thermoplastic material in a heated flowable condition at a temperature greater than its melt temperature, the thermoplastic material being susceptible to crystallization in the temperature range between its melt temperature and glass transition temperature. While the material is cooled within the mold, a first pressure $P_1$ is initially applied as the material cools from its melt temperature to a predetermined temperature above its glass transition temperature. Thereafter, a second pressure $P_2$ is applied to the material as it cools from that predetermined temperature to a temperature below its glass transition temperature. According to the method, $P_2$ is significantly greater than $P_1$. When the method is applied to polyethylene terephthalate material, $P_1$ is preferably about 1,000 psi and $P_2$ is preferably about 20,000 psi, with the temperature at which the greater pressure is applied being in the range of from about 180° C. to about 200° C.

The product formed by this method may, for example, be in the shape of a blowable parison, which may be reheated and blown within a blow mold cavity to the shape of a container.

As previously discussed, a family of curves may be generated to represent the spherulite growth rate at various temperatures and pressures. Accordingly, the invention may also be expressed in terms of that family of curves, as follows.

A first nominal pressure is applied to the material within the mold cavity as the material cools from its melt temperature to a predetermined temperature, so that the rate of spherulite growth initially follows a first curve at the lower end of the temperature range in the family of curves. During the application of the nominal pressure, the rate of growth is relatively minimal and corresponds to the initial portion of the "up side" of the first curve. When the material reaches the predetermined temperature, a drastically greater pressure is applied to the material to subject the material to a different spherulite growth rate corresponding to the "down side" of a second curve in the family of curves, with the second curve being one at the upper end of the temperature axis. Thus the rate of spherulite growth is also relatively minimal during the application of the drastically greater pressure while the material is cooled from the predetermined temperature to a temperature less than the glass transition temperature. Most preferably, the predetermined temperature corresponds to the temperature at which the first and second curves intersect along the temperature axis.

In the method for inducing crystallization by maximum rate of spherulite growth, a substantial pressure $P_1$ is initially applied to the material in the mold cavity until the rate of growth reaches its maximum for the specific pressure on the material, as plotted by the peak on the bell shaped curve corresponding to pressure $P_1$. After the rate reaches the peak, the pressure is proportionally decreased in direct relationship to the decreasing temperature during a portion of the cooling cycle so that only a nominal pressure $P_2$ is imposed upon the material at about the glass transition temperature of the material. By this method the rate of spherulite growth is essentially maintained at the peak of each of the curves in the family of curves while the material cools from melt temperature to glass transition temperature. When the method is applied to polyethylene terephthalate, the initial pressure $P_1$ is about 20,000 psi and the pressure is reduced about 300 psi for each degree in the reduction of temperature after the material reaches the peak growth rate.

It is believed that in these methods, the rate of spherulite growth may be limited to on the order of approximately about $0.04 \times 10^{-3}$ mm per second when suppressing crystallization. It also believed that in the method for inducing crystallization, the spherulite growth rate may be maintained at about $0.12 \times 10^{-3}$ mm per second during a significant portion of the cooling cycle between the melt temperature and glass transition temperature.

The apparatus for suppressing crystallization includes a hydraulic circuit which may be defined as means for initially applying a first nominal pressure during a portion of the cooling cycle and then thereafter applying a second, drastically greater pressure during the completion of the cooling cycle.

The apparatus for inducing crystallization likewise includes a hydraulic circuit which may be defined as means for initially applying a very substantial pressure on the material and then for proportionally decreasing the pressure on the material in substantially direct relationship to the temperature reduction in the material.

Accordingly, the present invention provides several significant advantages and improvements over the prior art, such as: (1) the ability to control the extent of crystallization in thermoplastic material, either to reduce or increase the rate of spherulite growth without sacrificing cycle time; (2) the capability to mold thicker articles without excessive crystallization; (3) a reduction of the flashing problem, particularly in the method where crystallization is suppressed, since the increased packing pressures on the material are applied after the material has cooled from a flowable condition; and (4) the capability to minimize degradation of thermoplastic material during a molding cycle.

These and other meritorious advantages and features will be more fully appreciated from the following detailed description of the invention and the appended claims.

BRIEF DESCRIPTION OF THE DRAWINGS

FIG. 1 is a schematic illustration of a family of bell-shaped curves plotted along a temperature axis, representing the amount of spherulite growth at five separate constant pressures during solidification cooling.

FIG. 2 is a schematic illustration of a bell-shaped spherulite growth rate curve which results from the application of a constant low pressure on the material as it cools from melt temperature to glass transition temperature.

FIG. 3 is a schematic illustration similar to FIG. 2, but representing the spherulite growth resulting from the application of a constant high pressure to the material as it cools from melt temperature to glass transition temperature.

FIG. 4 is a schematic illustration representing the total spherulite growth in the method of this invention where an initial nominal pressure is applied to the thermoplastic material and then a significantly higher pressure is applied in order to suppress crystallization.

FIG. 5 is a schematic illustration representing a different method in the invention, where an initial high pressure is applied to the thermoplastic material during the initial phases of cooling from melt temperature and then the pressure is proportionally reduced during cooling in order to induce crystal growth.

It is to be noted that the graphs of FIGS. 1-5 are schematic to represent the general concept of the rate and amount of spherulite growth. The precise shape of the curves may vary from that shown, since the temperature axis is not scaled as will be apparant by the relative dimensions between the various noted temperatures.

FIGS. 6-10 schematically illustrate a first embodiment for performing the methods of this invention.

Figure 11:
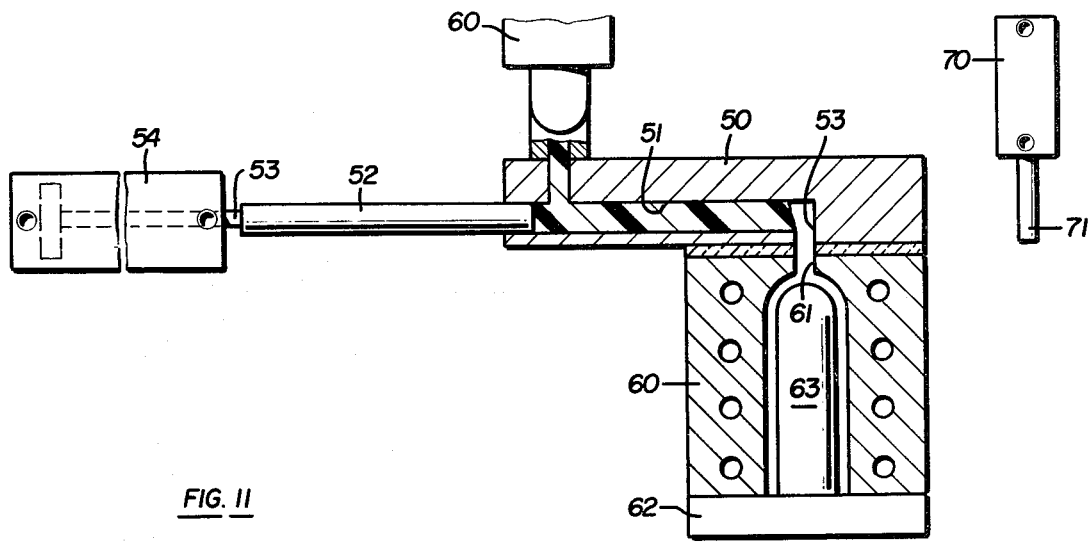
Figure 12:
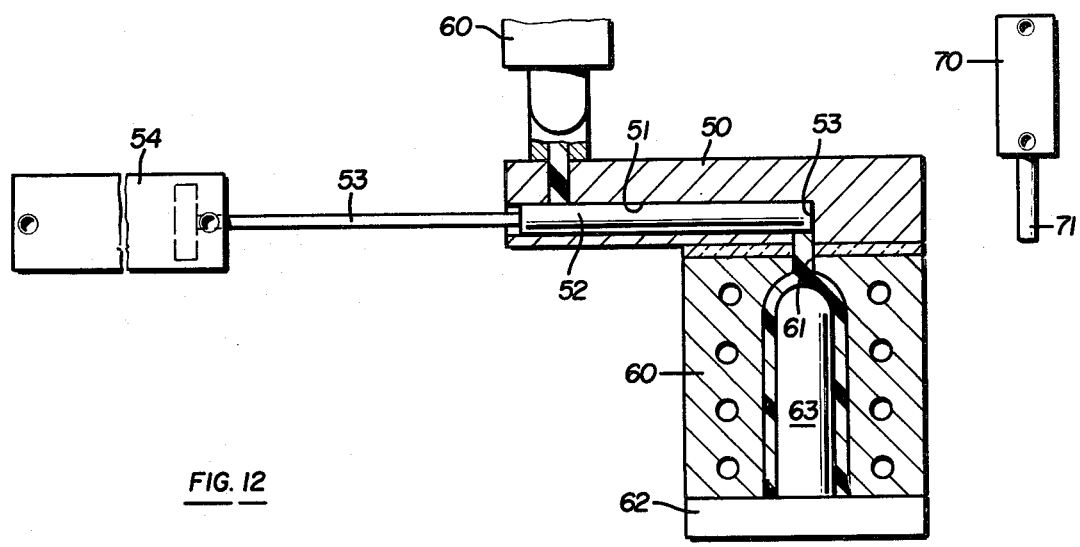
Figure 13:
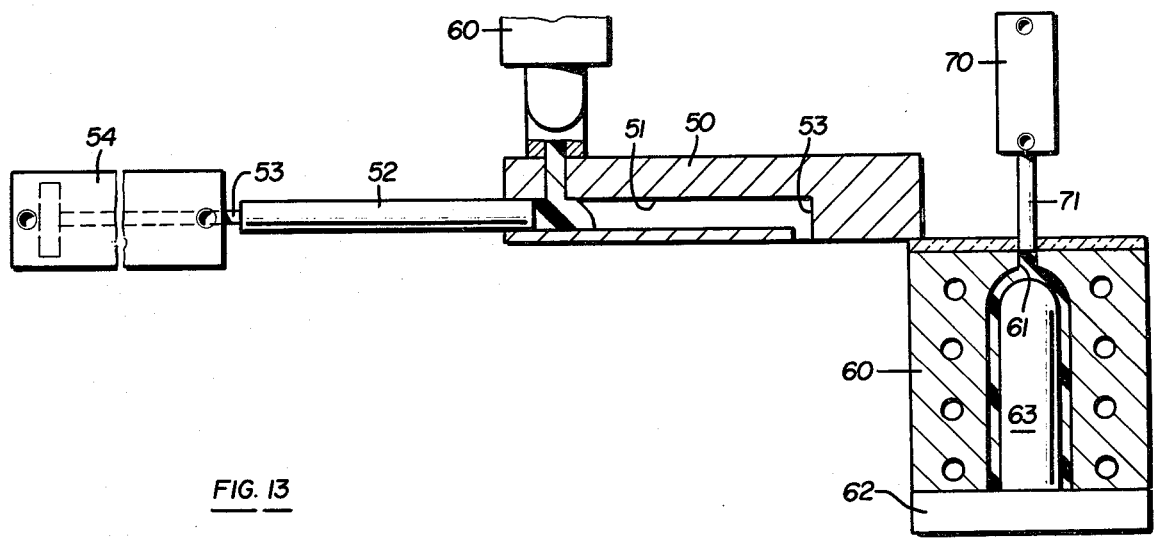

FIGS. 11-13 schematically illustrate a second embodiment for performing the methods of this invention.

Figure 14:
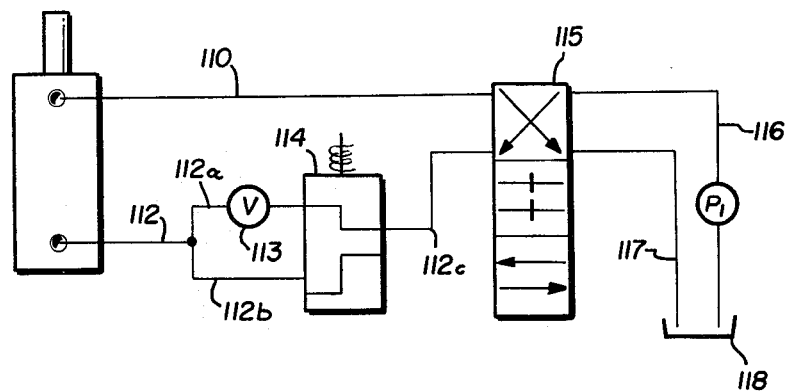
Figure 15:
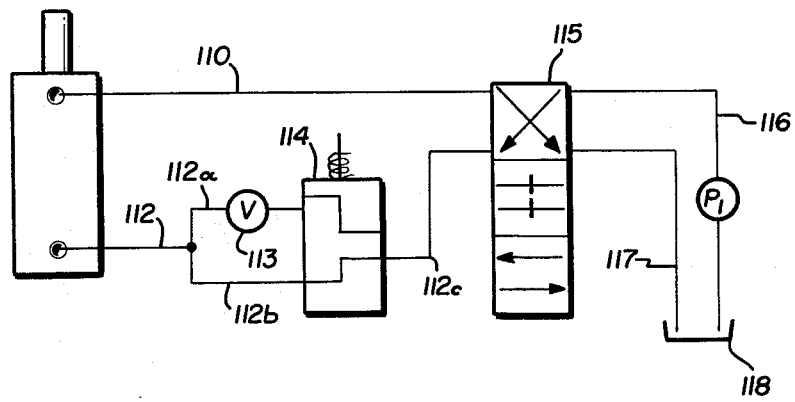

FIGS. 14 and 15 schematically illustrate a hydraulic circuit for performing the method where crystal growth is suppressed.

Figure 16:
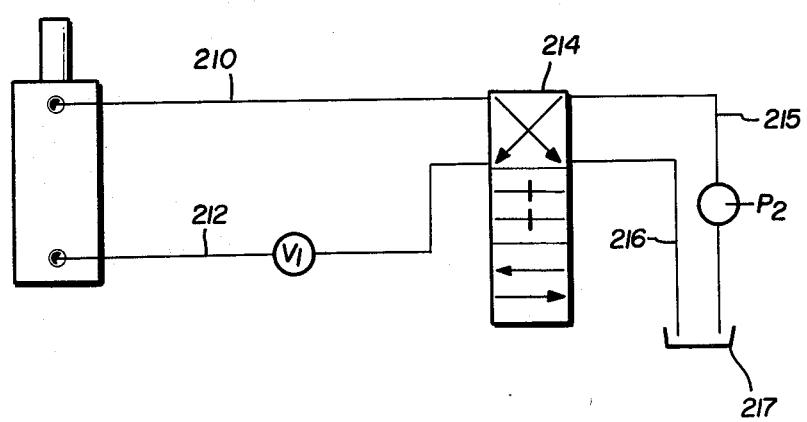
Figure 17:
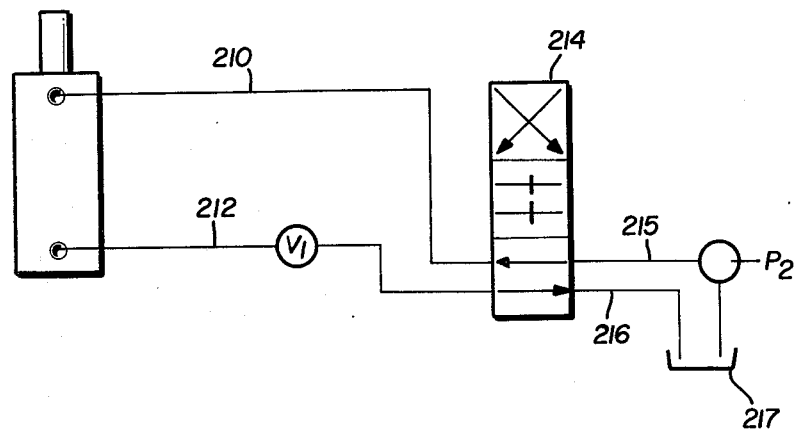

FIGS. 16 and 17 schematically illustrate a second hydraulic circuit for performing the method of inducing crystal growth.

BRIEF DESCRIPTION OF THE PREFERRED EMBODIMENT

GENERAL METHODS

Figure 1:
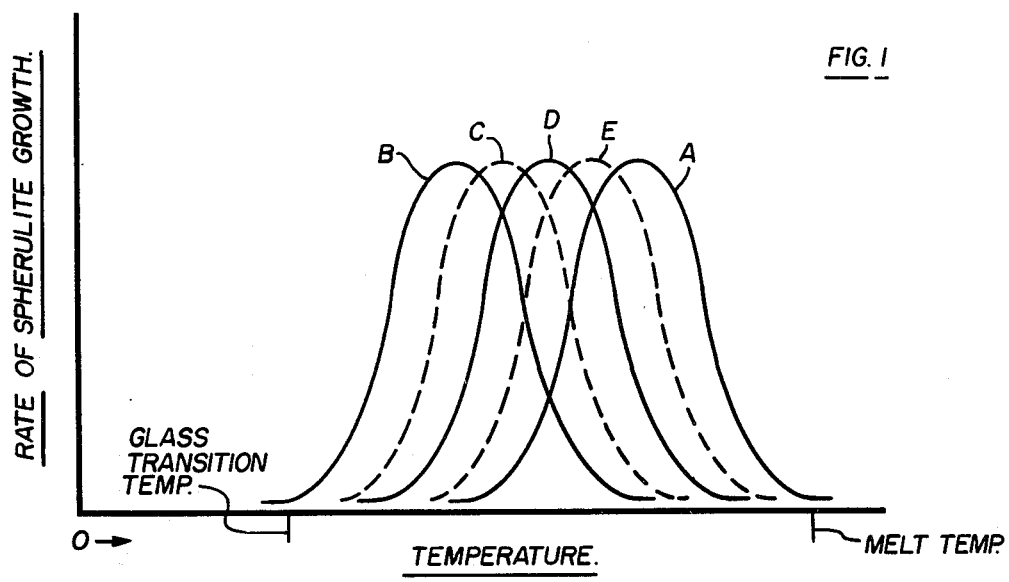
FIGS. 1-5 are schematic illustrations of bell-shaped curves representing the rate of spherulite growth, as a measure of the amount of crystallization particularly in polyethylene terephthalate material during solidification cooling from melt temperature to glass transition temperature. More specifically, each of these figures illustrate the following.

Referring now more particularly to the drawings, FIG. 1 schematically illustrates a family of curves plotted along a temperature axis to represent the rate and amount of spherulite growth in thermoplastic materials, particularly polyethylene terephthalate, during solidification cooling from melt temperature to glass transition temperature. Five separate curves A, B, C, D, and E, are plotted to schematically represent the spherulite growth rate in thermoplastic materials at five different, constant pressures. The area under each of these curves represents the total amount of spherulite growth, and the collection of curves illustrates that the total amount of spherulite growth in polyethylene terephthalate is approximately the same for equivalent solidification cooling time periods, regardless of the pressure imposed upon the material during the cooling process. The position of each curve is dependent upon the pressure applied to material during cooling, with the curve at the higher end of the temperature axis representing higher pressure. That is, the position of a bell-shaped curve along the temperature axis during solidification cooling is essentially directly proportional to the pressure on the material. Accordingly, curve A represents spherulite growth at a high pressure and curve B represents spherulite growth at a low or nominal pressure. Curves C, D, and E represent spherulite growth at different, constantly applied pressures during solidification cooling between the pressures for Curves A and B.

Each of these curves are generated by plotting the rate of spherulite growth as the material cools within a mold cavity from a temperature at the extreme right of the temperature axis to a temperature below the glass transition temperature, as indicated. Taking Curve A for example, when the thermoplastic material is injected in to the mold cavity at a temperature above melt temperature, the spherulite growth rate is zero, and in fact at these temperatures crystals tend to dissolve. As the thermoplastic material is cooled in the mold cavity, the rate of growth increases in a manner that may be plotted as one-half of a bell-shaped curve to a peak at a specific temperature, where the rate of growth then tends to decrease in a manner that may be plotted as the other one-half of the bell-shaped curve. At temperatures below the glass transition temperature, the spherulite growth rates become substantially nil.

As known, the glass transition temperature and melt temperature for thermoplastic materials are dependent upon the pressure imposed upon the material. Accordingly, these particular temperatures for the pressures represented by Curves A-E will vary, substantially in accordance with the following euqation:

$$Tg = Tg° + ap,$$

where Tg is the glass transition temperature for any specific pressure, Tg° is the glass transition temperature at atmospheric pressure, "a" is a pressure coefficient related to the particular thermoplastic material and "p" is the pressure. For polyethylene terephthalate "a" is approximately equal to about 0.002 to 0.003 Degrees C. per pound per square inch of pressure. The particular value of "a" may vary from this slightly depending upon the inherent viscosity of the polyethylene terephthalate.

Melt temperature may be calculated as follows:

$$Tm = Tm° + bp,$$

where Tm is the melt temperature of the thermoplastic material at a particular pressure, Tm° is the melt temperature of the thermoplastic material at atmospheric pressure, "b" is a pressure coefficient related to the particular thermoplastic material, and "p" is the particular pressure applied to the material. For polyethylene terephthalate the value of "b" is believed to be about 0.002 to about 0.003 Degrees C. per pound per square inch of pressure, but again this value may vary slightly from these figures depending upon the inherent viscosity of the particular polyethylene terephthalate.

As is known in the art, the glass transition and melt temperatures for polyethylene terephthalate material at atmospheric pressure are approximately 70 Degrees C. and 270 Degrees C., depending upon inherent viscosity.

The rate of crystallization, i.e. the growth rate of spherulite crystals in polyethylene terephthalate material may be approximated by the following equation:

$$G = \text{Exp}\left[G_o - \frac{777}{T - Tg + 24} - \frac{942(Tm - 303)^2}{(T + 273)^2(Tm + 303 - T)}\right]$$

where

G is the growth rate of the radius of a spherulite, expressed in mm per sec.

$G_o$ is a constant, based upon the inherent viscosity of the material.

For example, the value of $G_o$ will be about 14.6 for 1.0 i.v. (inherent viscosity) thermoplastic materials, with the value being slightly higher for lower i.v. materials.

"Exp" indicates exponential.

T is the temperature of the material, expressed in Degrees Centigrade.

Tm and Tg may be determined from the previous set of equations, inserting the appropriate values for Tg°, a, Tm°, b and p.

Figure 2:
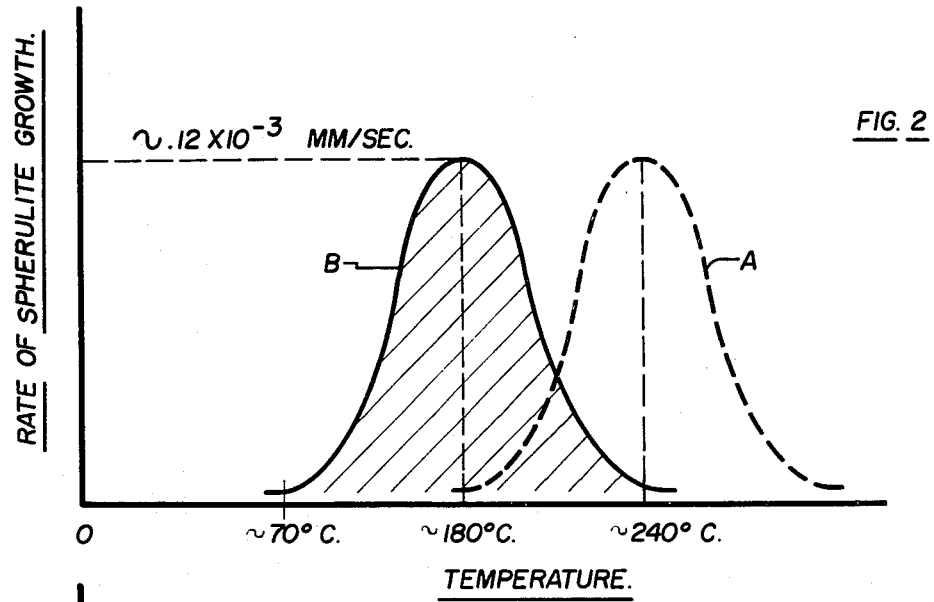

Turning now more particularly to FIG. 2, curve B is shown with curve A (in phantom) in relationship to approximate temperatures along the temperature axis. This Figure represents the method where a nominal pressure, such as on the order of about 1,000 psi, is constantly applied to polyethylene terephthalate material during solidification cooling. In the process, the material crystallizes at an insubstantial rate until the temperature reaches approximately 240 Degrees C., at which point the rate of spherulite growth begins to follow the "up side" of the bell-shaped crystallization curve B to a peak at approximately 180 Degrees C. As indicated, the maximum rate for spherulite growth is on the order of approximately about $0.12 \times 10^{-3}$ mm per second as noted in an article appearing on pages 2423 to 2435 in Volume X of *The Journal of Polymer Science*, by F. Van Antwerpen and D. W. Van Krevelen, which article is incorporated by reference. At about the temperature of 180 Degrees C., the spherulite growth rate begins to decrease at a rate corresponding to the "down side" of the bell-shaped curve. When the material reaches the glass transition temperature of about 70 Degrees C., the growth rate has very nearly approached zero.

Figure 3:
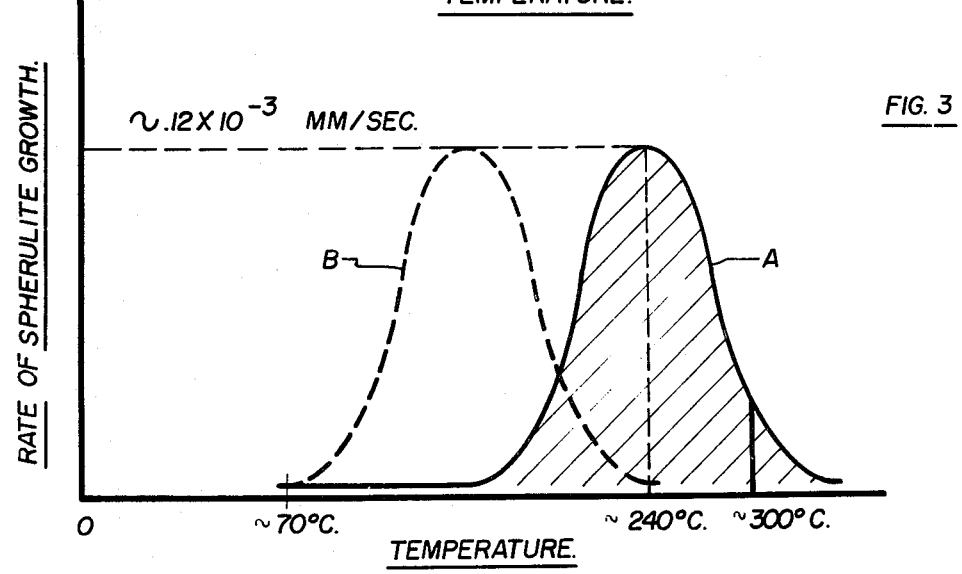

Referring to FIG. 3, curve A is shown with curve B (in phantom) to represent the spherulite growth rate history of polyethylene terephthalate when subjected to a pressure on the order of 20,000 psi during solidification cooling. At this particular pressure, the melt temperature of the material is on the order of approximately 320 to 330 Degrees C. and the glass transition temperature is on the order of approximately 105 to 120 Degrees C. Sice polyethylene terephthalate material is generally at a temperature of about 300 Degrees C. when injected into a mold cavity, th entire bell-shaped curve may not be generated, the only portion omitted being that portion to the right of the line at 300 Degrees C.

Accordingly, if polyethylene terephthalate material is injected into a mold cavity at 300 Degrees C. and is immediately subjected to a pressure of 20,000 psi, the spherulite growth rate will start essentially part way up the "up side" of the bell-shaped curve. The growth rate will increase as the material is cooled, up to a peak which occurs at approximately 240 Degrees C. Again, this maximum growth rate is on the order of approximately about $0.12 \times 10^{-3}$ mm per second. As the material cools below 240 Degrees C., the growth rate decreases in accordance with the "down side" of the bell-shaped curve A.

THE METHOD FOR SUPPRESSING CRYSTALLIZATION

Figure 4A:
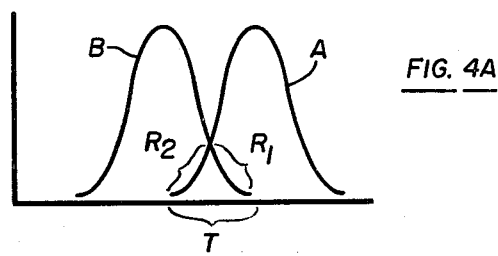
FIG. 4A is a simplified schematic illustration similar to FIG. 4.
Figure 4:
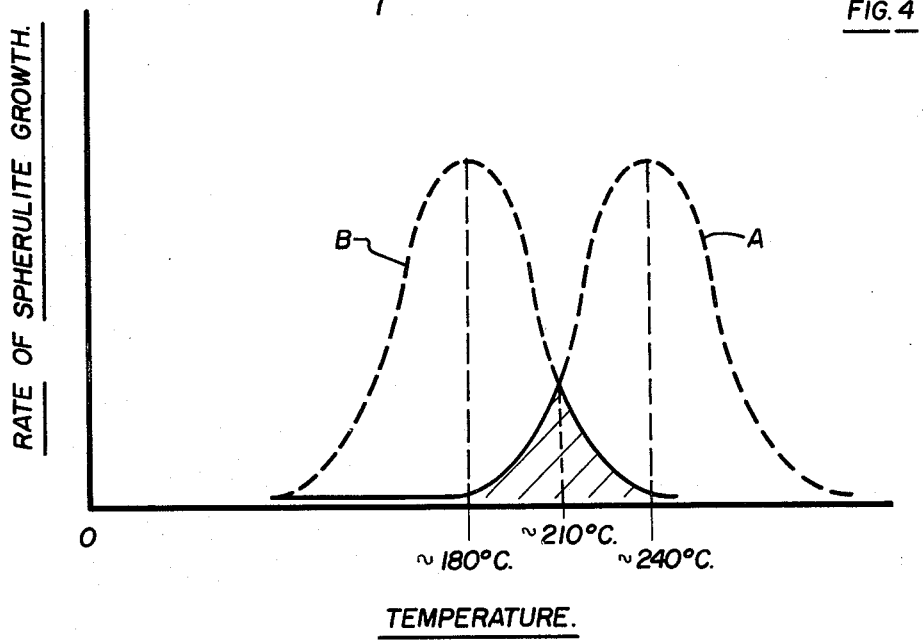

FIGS. 4 and 4A collectively represent one method of this invention, by which the amount and rate of spherulite growth is limited, as may be desired in situations where the molded article will be post-formed, such as in a blow molding operation. This method involves filling a mold cavity with a thermoplastic material, such as polyethylene terephthalate, at a nominal pressure on the order of approximately 1,000 psi. As the material cools within the mold, a similar nominal pressure, such as on the order of 1,000 psi, is imposed upon the material until a temperature in the range T (FIG. 4A) on the order of about 210 Degrees C. is reached. During this phase of cooling, the growth rate follows the initial "up side" R, of curve B until it reaches a temperature at about the point of intersection with the "down side" of curve A. At about that temperature, a drastically increased pressure, on the order of about 20,000 psi, is applied to the material to subject the material to a different curve A in the family of spherulite growth rate curves. Accordingly, rather than the rate increasing to a peak of about $0.12 \times 10^{-3}$ mm per second, the rate peaks out at a value significantly less than that rate and decreases in accordance with the final phase $R_2$ of the "down side" of curve A. Since the area under the growth rate curve represents total amount of spherulite growth, the shaded portion in FIG. 4 represents a significant decrease in overall crystallization when compared to the shaded portions in FIGS. 2 and 3.

Of course, the precise intersection point of curves A and B may not fall exactly on 210 Degrees C., but should be in about the range of from 200 to about 220 Degrees C. By using a value of 70 Degrees C. for Tg (glass transition temperature) and 270 Degrees C. for Tm (melt temperature), the point of intersection between curve A and B can be represented as approximately Tg + ⅔ (Tm − Tg).

Additionally, it will be appreciated that if the increased pressure is not initiated at the point of the intersecting curves, the actual spherulite growth rate curve will vary slightly from that shown in FIG. 4, which represents an ideally controlled condition. It should be noted that the nominal pressure of 1,000 psi is chosen as an exemplary pressure. The actual nominal pressure should reflect two considerations: (1) it is desirable to impose a very low pressure on the material so that the growth rate follows a curve at the lower end of the temperature axis while the material initially cools from melt temperature; and (2) preferably, at least some nominal pressure should be applied to the material during this phase of cooling to eliminate sink marks.

By using the combination of an initial pressure of 1,000 psi and a later pressure of 20,000 psi applied at the proper time, it is believed that the maximum spherulite growth rate can be limited to a value on the order of about $0.04 \times 10^{-3}$ mm per second.

THE METHOD FOR INDUCING CRYSTALLIZATION

Figure 5:
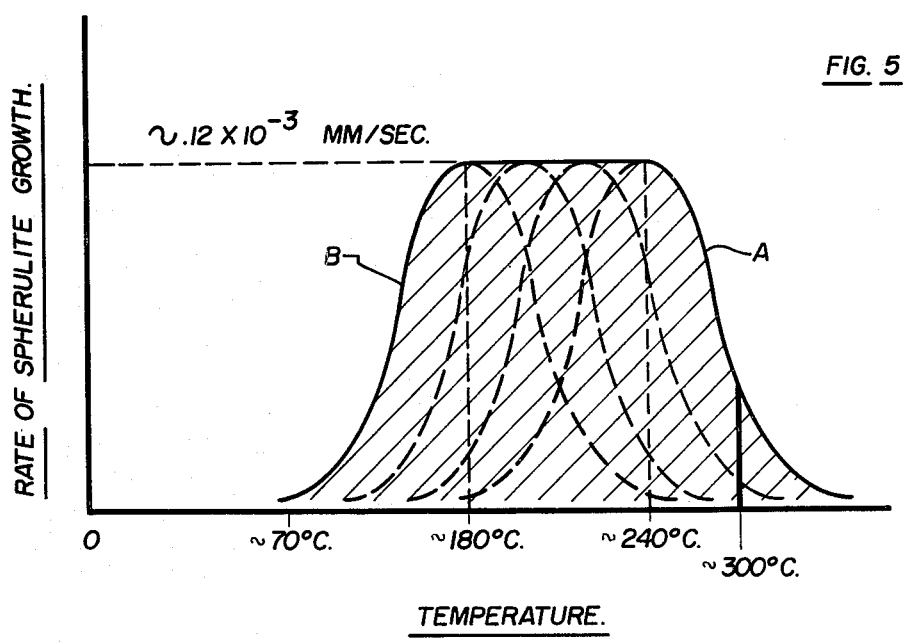

FIG. 5 represents a separate method in this invention for inducing or stimulating crystallization in thermoplastic materials, as may be desired in situations where a finished molded article is being formed. As will become apparent, FIG. 5 represents a consolidation of all the family of curves along the temperature axis, with the shaded area again representing total amount of spherulite growth.

In this method, the polyethylene terephthalate is subjected to a very high pressure, such as on the order of about 20,000 psi, immediately after it is injected into the mold cavity. Accordingly, the spherulite growth rate follows the "up side" of curve A to the peak, which occurs at approximately 240 Degrees C. Below that temperature, the pressure on the material in the cavity is proportionally reduced in direct relationship to the temperature reduction during solidification cooling, thus effectively maintaining the growth rate at the peak of each curve in the family. At a temperature of about 180 Degrees C., the rate starts to decrease along the last of the curves in the family as represented by curve B, with the rate reaching approximately zero at the glass transition temperature of 70 Degrees C. In this particular method, curve B may represent either a nominal pressure or atmospheric pressure, since the application of a nominal pressure may be unnecessary due to sufficient solidification of the material.

Assuming (a) that an initial pressure of 20,000 psi is applied until the material cools to a temperature of 240 Degrees C. and (b) that the pressure is reduced in direct proportion to the reduction in temperature to a point where the pressure on the material at 180 Degrees C. is zero psi, then the pressure is reduced about 333 psi for each degree in the reduction of temperature in that range. As shown, by this method the rate of spherulite growth is maintained at about $0.12 \times 10^{-3}$ mm/sec during the cooling cycle between about 240 Degrees C. and 180 Degrees C.

THE SPECIFIC STRUCTURAL EMBODIMENTS

The two embodiments shown in FIGS. 6-10 and in FIGS. 11-13 represent apparatus which may be used to either suppress or induce crystallization.

The hydraulic circuit of FIGS. 14 and 15 illustrate a means for suppressing crystallization; and the hydraulic circuit of FIGS. 16 and 17 likewise represents a means for inducing crystallization.

The Embodiment Of FIGS. 6-10

Figure 6:
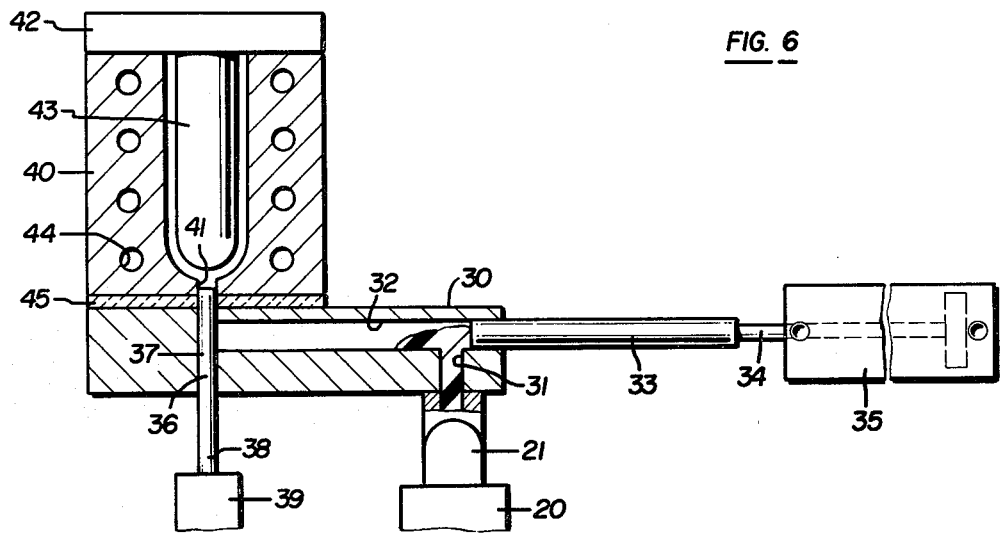

FIG. 6 illustrates the initial step proposed by the present method; i.e., filling an accumulator chamber with thermoplastic material under low pressure. This is accomplished by flowing heated thermoplastic material from a nozzle 21 of an appropriate plasticizer 20, through a flow passageway 31, and into an accumulator chamber 32 of the accumulator 30. As shown, one end of the accumulator chamber 32 is closed by an axially reciprocal ram 33 that may be moved into the accumulator chamber 32 by a piston rod 34 of a hydraulic cylinder arrangement 35. During filling, the other end of accumulator chamber 32 is closed by a pressurizing rod 36 which is positioned to close off a flow passageway 37, the pressurizing rod being axially reciprocal by a piston 38 of a hydraulic cylinder arrangement 39.

As illustrated, a female mold 40 is positioned adjacent the accumulator 30 to receive thermoplastic material by way of a sprue opening 41 in alignment with passageway 37. A movable male mold 42 including a core pin 43 cooperates with the female mold 40 to define an essentially tubular mold cavity, such as to form a plastic parison which may be blown to shape in a subsequent blow molding operation, as is conventional in the art.

Female mold 40 is cooled by internal ducts 44 and core pin 43 is cooled by similar internal ducts (not shown). Since the accumulator chamber is maintained in a heated condition by suitable heaters (not shown) a layer of insulation material 45 may be interposed between the female mold 40 and the accumulator 30.

Figure 7:
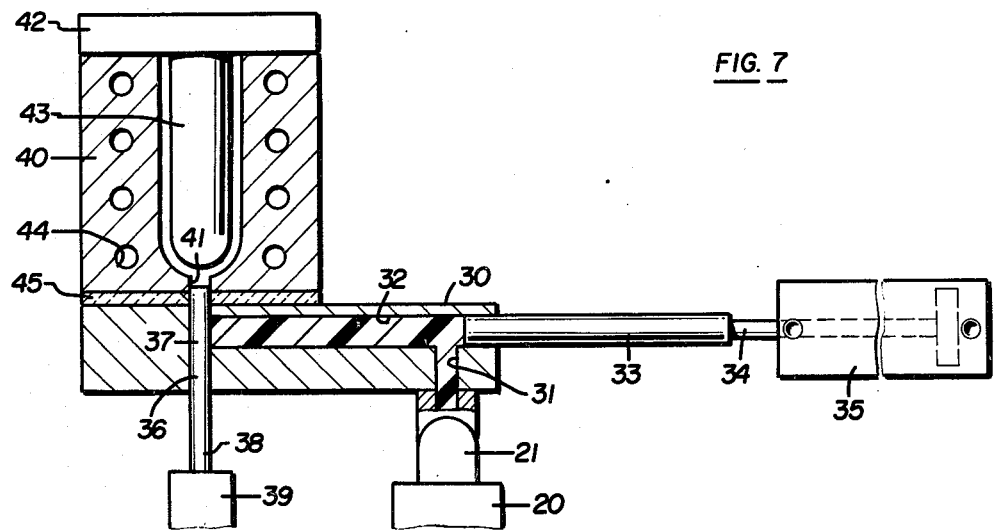

FIG. 7 represents the point in time when the accumulator chamber 32 is filled with thermoplastic material. At that time, pressurizing rod 36 is retracted by piston 38 to the postion shown in FIG. 8, and then ram 33 is displaced into the accumulator chamber 32 to force the material into the mold cavity. In the method of suppressing crystallization, the pressure of filling should be maintained at a nominal level.

Figure 8:
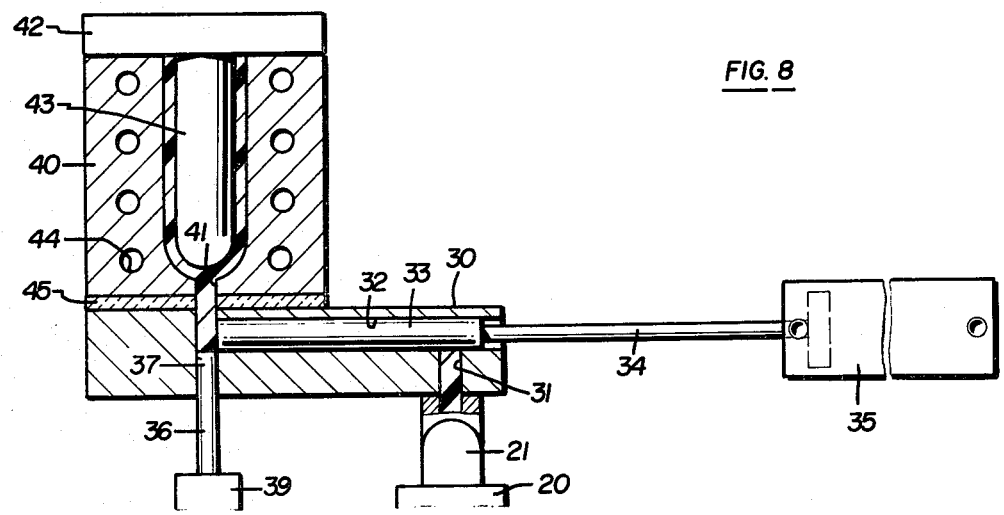
Figure 9:
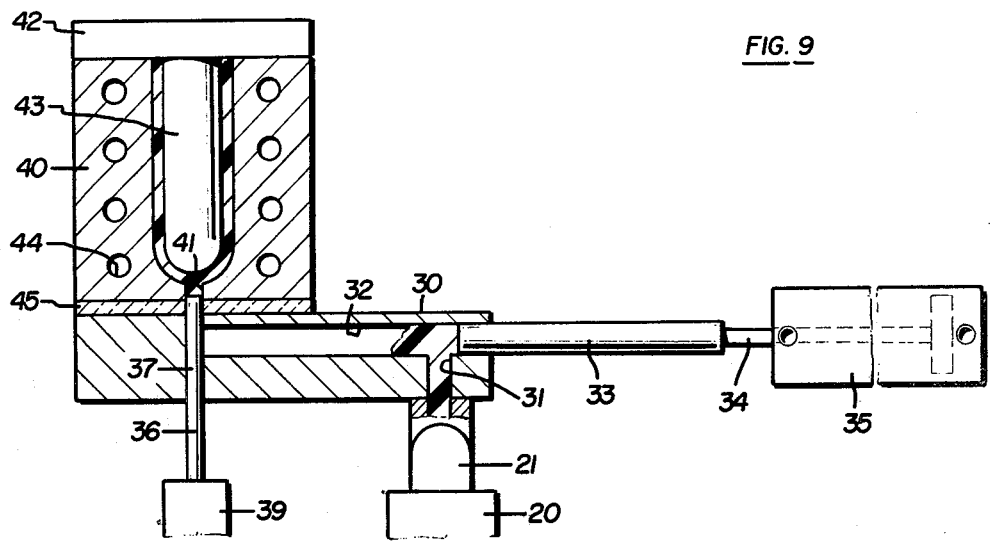
Figure 10:
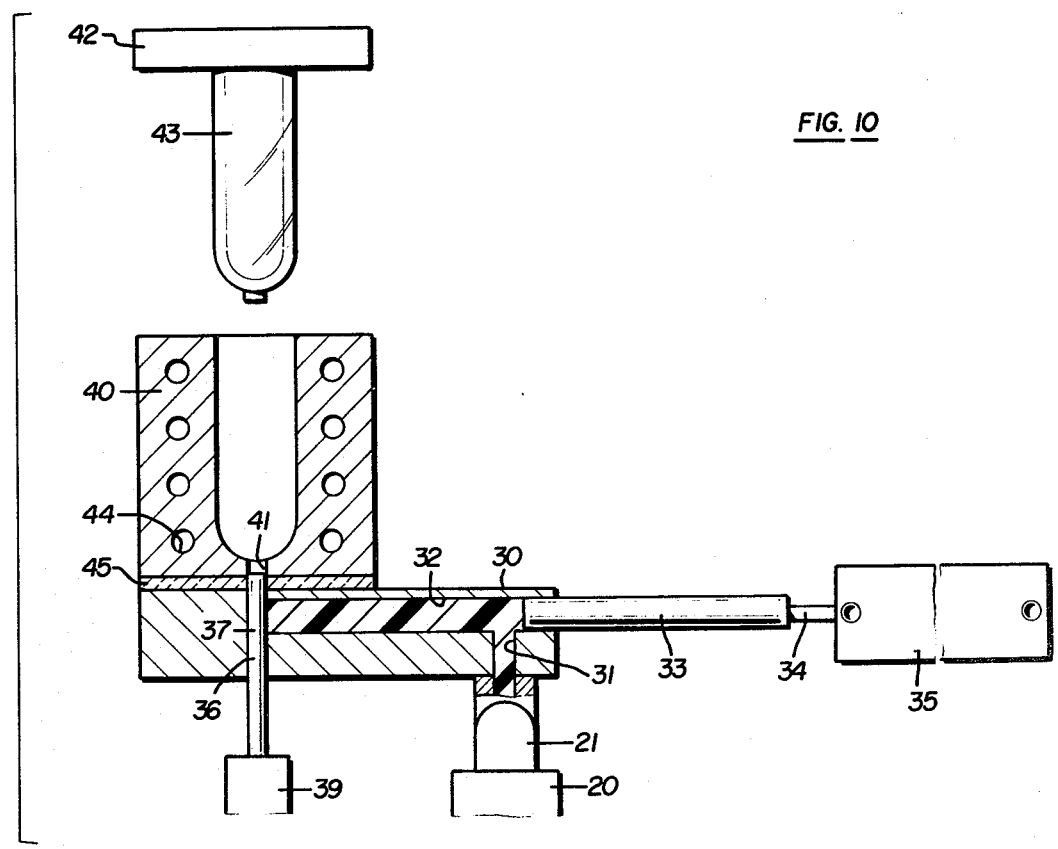

Upon completing the advancement of ram 33 into the accumulator chamber to the position shown in FIG. 8, pressurizing rod 36 is advanced into passageway 37, as shown in FIG. 9 to apply pressure to the material within the mold cavity. At about the same time ram 33 is retracted, also as shown in FIG. 9, to allow the flow of thermoplastic material from plasticizer 20 into accumulator 30. As will be apparent, in the method of minimizing crystallization, a nominal pressure will be applied by pressurizing rod 36 during the initial phases of cooling; thereafter, a greater pressure will be applied in accordance with FIG. 4. Conversely, in the method of inducing crystallization, pressurizing rod 36 will initially apply a rather large pressure, and then proportionally reduce the pressure on the material in the mold cavity in accordance with FIG. 5.

When the thermoplastic material within the mold cavity is sufficiently cooled to a self-sustaining condition, male mold member 42 is retracted by suitable hydraulic means (not shown) and the molded article is stripped from core pin 43 in conventional manners known in the art. Thereafter, core pin 43 and female mold 40 are repositioned, and the process is repeated.

The Embodiment of FIGS. 11–13

This embodiment relates to an assembly where the mold may be moved to a separate station for the application of pressure to the thermoplastic material during solidification cooling.

Referring more particularly to FIG. 11, an accumulator chamber 51 of an accumulator assembly 50 is filled with thermoplastic material from a suitable plasticizer 60. One end of the accumulator chamber 51 is closed by an axially reciprocal ram 52 which is displaced by a piston 53 of a hydraulic cylinder arrangement 54. The other end of the chamber 51 terminates in a passageway 55 in alignment with a sprue opening 61 of a female mold 60. A male mold member 62 including a core pin 63 completes the mold assembly to define an essentially cylindrical mold cavity.

A pressurizing rod 70 of a hydraulic cylinder arrangement 71 is laterally spaced from the accumulator 50, as shown in FIG. 11.

When the accumulator chamber 51 is substantially filled with thermoplastic material, ram 52 is displaced into the chamber 51 by piston rod 53 to force the material through passageways 55 and 61 into the mold cavity, as shown in FIG. 12. Thereafter, the mold assembly is laterally displaced to a position under the pressurizing rod 70, as shown in FIG. 13, whereupon the rod 70 is inserted into the sprue opening 61 to apply pressure to the material within the mold cavity. Likewise, the application of pressure by rod 70 may be varied in accordance with the previously described methods to either suppress or induce crystallization.

FIG. 13 also shows that thermoplastic material may be flowing into accumulator 50 while the mold is at the pressurizing station. In the same manner as described in connection with the embodiment of FIGS. 6–10, when the material in the mold is sufficiently cooled, male mold member 62 is displaced axially to accommodate the ejection of the molded part. Thereafter, the mold assembly is displaced back to the position shown in FIG. 11 to repeat the process.

The Embodiment of FIGS. 14 and 15

FIGS. 14 and 15 schematically illustrate a hydraulic circuit which may be used to control the displacement of either rod 36 in the embodiment of FIGS. 6–10 or rod 70 in the embodiment of FIGS. 11–13 to suppress crystallization in polyethylene terephthalate in accordance with the present invention.

The circuit includes a first hydraulic flow line 110 which is connected to the rod end of either cylinder 39 or 71 and a second flow line 112 connected to the opposed end of the cylinder. Branch lines 112a and 112b are interconnected with line 112 and lead to a "two-positicn" valve 114, with a reducing valve 113 being provided in branch line 112a for a purpose explained later. A further branch line 112c, as well as line 110, lead to a "three-position" valve 115, with lines 116 and 117 leading from valve 115 to a sump 118. A pump P1 is included in line 116 to supply hydraulic fluid from the sump through appropriate branch lines to displace the pistons in a manner to suppress crystallization.

In operation, FIG. 14 illustrates the hydraulic circuits for advancing either rod 36 or 70 to apply a first nominal pressure to the thermoplastic material in the mold cavity. More specifically, pump P1 causes hydraulic fluid to flow through line 116, through the "three-way" valve 115 and into branch line 112c. In order to achieve the initial application of a nominal pressure, valve 114 is positioned so that hydraulic fluid from branch line 112c flows through the reducing valve 113 then into branch line 112a, line 112 and into the opposed end of the cylinder. At the appropriate point in time when a drastically greater pressure is needed to shift the bell-shaped spherulite growth curve, valve 114 is shifted to the position shown in FIG. 15. Accordingly, hydraulic fluid flows from branch line 112c, through a second branch line of valve 114, into branch line 112b, line 112 and into the hydraulic cyclinder.

To retract the piston rod into the cylinder, valve 114 remains in the position shown in FIG. 15, but the "three-way" valve 115 is shifted so that hydraulic fluid is pumped from line 116 into line 110. As will be appreciated, hydraulic fluid flows from the opposed end of the cylinder into line 112, through branch line 112b, valve 114, branch line 112c, an appropriate line of valve 115, line 117 and into sump 118.

The Embodiment of FIGS. 16 and 17

FIGS. 16 and 17 schematically illustrate a hydraulic circuit which may be used to control the displacement of either rod 36 in the embodiment of FIGS. 6–10 or rod 70 in the embodiment of FIGS. 11–13 in order to induce crystallization in polyethylene terephthalate in accordance with the present invention.

The circuit includes first and second hydraulic flow lines 210 and 212 respectively leading from the rod and opposed ends of a hydraulic cylinder to a "three-way" valve 214. A valve V1 is provided in line 212 for a purpose to be explained later. Lines 215 and 216 lead from the "three-way" valve 214 to a sump 217, with a pump P2 being included in line 215.

In operation, "three-way" valve 214 is positioned as shown in FIG. 16 to initiate the process so that pump P2 delivers fluid through lines 215 and 212 to advance the piston rod into the mold cavity in order to initially impose a high pressure on the thermoplastic material. During this phase of the operation, valve V1 is fully opened.

At the appropriate time in the process when it becomes desirable to slightly retract the rod in order to proportionally reduce the pressure on the thermoplastic material as it cools, the "three-way" valve 214 is shifted to the position shown in FIG. 17. Concurrently, valve V1 is substantially closed to restrict the flow of hydraulic fluid from the opposed end of the cylinder through line 212. To properly regulate the retraction of the piston rod to proportionally decrease the pressure on the thermoplastic material during solidification cooling, valve V1 may be regulated either in response to time or temperature of the material in the mold. When it becomes desirable to fully retract the piston rod, valve V1 may be fully opened.

The foregoing disclosure is presented as exemplary of the present invention, which is limited only by the following appended claims. For example, the invention has been presented primarily in connection with polyethylene terephthalate material. However, the invention may be used with other thermoplastic materials, such as polypropylene, which crystallize at a temperature between the range of melt temperature and glass transition temperature. Further, a pressure of 20,000 psi for the "high pressure" may not be required in all circumstances and with all materials. Other pressures on the order of about 10,000 to 15,000 psi may be quite suitable in practice.

The terms "melt temperature" and "glass transition temperature" as used in the following claims are intended to denote Tm° and Tg°, as previously defined, unless otherwise specifically defined.

Having fully and completely defined my invention, I now claim:

1. In a method of suppressing crystallization in a plastic material susceptible to crystallizing when cooling from its melt temperature to a temperature below its glass transition temperature in response to both temperature and pressure, such that the total amount of spherulite growth may be expressed as the area under a bell-shaped curve derived from the rate of spherulite growth and plotted on a temperature axis with the position of the curve on the axis being in direct relationship to the pressure on the material, the method comprising the steps of:
   (1) filling a mold cavity with said thermoplastic material in a heated flowable condition at a temperature greater than its melt temperature;
   (2) while cooling the material from its temperature in Step (1) to a temperature below its glass transition temperature, (a) initially applying a first pressure $P_1$ as the material cools from its melt temperature to a predetermined temperature above its glass transition temperature, the pressure $P_1$ being sufficient to assure a properly molded product but yet being minimal to position the growth curve at lower temperatures while the material is at the higher temperatures, in order to limit the rate of spherulite growth during the earlier phases of cooling, and (b) thereafter applying a second pressure $P_2$ as the material cools from said predetermined temperature to a temperature below its glass transition temperature, where $P_2 >> P_1$ to effectively shift the growth curve to higher temperatures while the material is cooled at lower temperatures, in order to limit the rate of spherulite growth during the final phases of cooling.

2. In a method of suppressing crystallization in a plastic material susceptible to crystallizing when cooling from its melt temperature to a temperature below its glass transition temperature in response to both temperature and pressure, such that the total amount of spherulite growth may be expressed as the area under a bell-shaped curve derived from the rate of spherulite growth and plotted on a temperature axis with the position of the curve on the axis being in direct relationship to the pressure on the material, the steps of:
   filling a mold cavity with said material at a temperature greater than its melt temperature;
   applying a nominal pressure to said material in the mold as the material is cooled to a temperature below its melt temperature, the nominal pressure being sufficient to assure a properly molded product but yet being minimal to position the growth curve at lower temperatures while the material is at the higher temperatures, in order to limit the rate of spherulite growth during the earlier phases of cooling; and
   at a predetermined time prior to the time that the material is cooled to its glass transition temperature, drastically increasing the pressure on the material to effectively shift the growth curve to higher temperatures while the material is cooled at lower temperatures, in order to limit the rate of spherulite growth during the final phases of cooling.

3. The method as defined in claim 2, wherein the material is polyethylene terephthalate, $P_1$ is about 1,000 psi, $P_2$ is about 20,000 psi and the predetermined temperature is in the range of about 200 Degrees C. to about 220 Degrees C.

4. The method as defined in claim 2, wherein the mold cavity is essentially a tubular shape, and the thermoplastic material formed in the cavity is in the shape of a blowable parison, characterized by removing the parison from the mold cavity and thereafter blowing the parison internally of a blow mold to form a blow container.

5. In a method of controlling the crystallization of polethylene terephthalate, the steps of:
   (1) filling a mold cavity with polyethylene terephthalate material at a temperature which is about the melt temperature of the material at the pressure of filling;
   (2) establishing a first hydrostatic pressure on the material within the mold while simultaneously cooling the material from said melt temperature to a predetermined temperature greater than the glass transition temperature for polyethylene terephthalate, the first pressure being minimal in order to minimize crystallization and being only as great as necessary to prevent sink marks in the molded product;
   (3) limiting the duration of Step (2), to limit the rate of spherulite growth of the polyethylene terephthalate to a rate which is substantially less than the maximum rate of spherulite growth of the material; and (4) following Step (2) effecting a decreasing rate of spherulite growth as the material cools to its glass transition temperature, by establishing a second hydrostatic pressure on the material at said predetermined temperature, wherein said second pressure is substantially greater than the pressure established during the performance of Step (2).

6. In a method of limiting crystallization in polyethylene terephthalate while such material cools within a confined cavity from a heated, flowable condition to a self-sustaining condition, the polyethylene terephthalate material being susceptible to crystallization in response to both temperature and pressure at a spherulite growth rate and amount which may be expressed as a family of successive bell-shaped curves along a temperature axis, with each curve representing the growth rate at a different pressure and with the location of these curves along said axis being directly proportional to the pressure applied to the material during cooling, the steps of:
applying a first nominal pressure to the material in said cavity as the material cools from its melt temperature to a temperature at about a predetermined temperature, so that the rate of spherulite growth follows a first curve in said family which is at the lower end of the temperature range, such that the rate of spherulite growth is relatively minimal while the material is cooled from the melt temperature to said predetermined temperature;
upon the material reaching a temperature at about said predetermined temperature, drastically increasing the pressure on the material to subject the material to a different spherulite growth rate corresponding to a second curve in said family which is at the upper end of the temperature curve, such that the rate of spherulite growth is relatively minimal while the material is cooled from said predetermined temperature to a temperature less than the glass transition temperature of the material, where said predetermined temperature is at about that temperature where said first and second curves intersect.

7. A method for limiting the growth rate of crystals in polyethylene terephthalate during solidification cooling within a mold cavity from melt temperature to a temperature where the material is in a self-sustaining condition, wherein the polythylene terephthalate is susceptible of a maximum spherulite growth rate on the order of approximately $0.12 \times 10^{-3}$ mm per second when cooled at a substantially constant pressure, comprising the steps of:
while the polyethylene terephthalate cools from melt temperature to glass transition temperature, (a) applying a nominal pressure to the material within the mold cavity until the spherulite growth rate reaches a rate on the order of approximately about $0.04 \times 10^{-3}$ mm per second and then, (b) reducing the rate of growth by applying a drastically greater pressure to the material, and (c) maintaining the drastically greater pressure on the material at least until the material reaches its glass transition temperature.

8. A method of inducing crystallization in an article of polyethylene terephthalate, by the steps of:
filling a mold cavity with heated, flowable polyethylene terephthalate at a temperature approximately its melt temperature;
cooling the polyethylene terephthalate material in the mold under a pressure of about 20,000 psi until the temperature of the material reaches about 240 Degrees C.; and
thereafter, continuing to cool the polyethylene terephthalate material within the mold to a temperature at least as low as about 70 Degrees C., and reducing the pressure on the material about 333 psi for each degree in the reduction of temperature between the temperature of 240 Degrees C. and 180 Degrees C.

9. In a method of stimulating crystal growth in a thermoplastic material which is susceptible to crystallization at a spherulite growth rate and amount dependent upon both temperature and pressure, such that the rate of growth may be expressed as a bell-shaped curve on a temperature axis, with the entire curve being shifted to higher temperatures on the axis for higher pressures, the steps of:
filling the mold cavity with said thermoplastic material in a heated, flowable condition at a temperature greater than the melt temperature of the material;
cooling the material in the mold cavity at a pressure $P_1$ until the rate of spherulite growth reaches about its maximum for the specific pressure $P_1$ on the material, as plotted by the peak on the bell-shaped curve; and
thereafter, continuing to cool the material in the mold cavity and proportionally decreasing the pressure on the material in direct relationship to the decreasing temperature so that a pressure $P_2$ is imposed upon the material at about the glass transition temperature of the material, in order to maintain the rate of spherulite growth at about the peak of the bell-shaped curve by effectively shifting the bell-shaped growth rate curve to lower temperatures, where $P_1 \gg P_2$.

10. In a method of inducing crystal growth in polyethylene terephthalate, the steps of:
filling a mold cavity with polyethylene terephthalate;
while the material cools from a temperature at about its melt temperature to a temperature below glass transition temperature, (a) applying a pressure of about 20,000 psi until the crystal growth rate reaches about $0.12 \times 10^{-3}$ mm per second and thereafter (b) maintaining the crystal growth rate at about $0.12 \times 10^{-3}$ mm per second for a significant portion of the cooling cycle, by reducing the pressure on the material substantially in direct proportion to the reduction of temperature so that the pressure on the material at glass transition temperature is minimal.

* * * * *